United States Patent
Ivanovic et al.

(10) Patent No.: US 9,947,114 B2
(45) Date of Patent: Apr. 17, 2018

(54) MODIFYING GRADATION IN AN IMAGE FRAME INCLUDING APPLYING A WEIGHTING TO A PREVIOUSLY PROCESSED PORTION OF THE IMAGE FRAME

(71) Applicant: ATI Technologies ULC, Markham (CA)

(72) Inventors: Boris Ivanovic, Richmond Hill (CA); Tiberiu Visan, Burlington (CA)

(73) Assignee: ATI Technologies ULC, Markham, Ontario (CA)

( * ) Notice: Subject to any disclaimer, the term of this patent is extended or adjusted under 35 U.S.C. 154(b) by 0 days.

(21) Appl. No.: 14/526,220

(22) Filed: Oct. 28, 2014

(65) Prior Publication Data

US 2016/0117794 A1    Apr. 28, 2016

(51) Int. Cl.
*G06T 5/00*    (2006.01)
*G06T 11/00*    (2006.01)

(52) U.S. Cl.
CPC ............ *G06T 11/001* (2013.01); *G06T 5/002* (2013.01); *G06T 5/009* (2013.01); *G06T 2200/28* (2013.01); *G06T 2207/10016* (2013.01)

(58) Field of Classification Search
None
See application file for complete search history.

(56) References Cited

U.S. PATENT DOCUMENTS

| | | | | |
|---|---|---|---|---|
| 6,335,990 | B1* | 1/2002 | Chen ................... | H04N 5/21 348/607 |
| 7,336,275 | B2* | 2/2008 | Lefebvre ............ | G06F 7/582 345/422 |
| 7,657,113 | B2* | 2/2010 | Wong ................. | G06K 9/40 348/618 |
| 7,822,286 | B2* | 10/2010 | Yea .................... | G06T 5/20 382/205 |
| 7,889,233 | B2* | 2/2011 | Mead ................ | H04N 19/176 348/180 |
| 2008/0298680 | A1* | 12/2008 | Miller ............... | G06T 5/008 382/168 |
| 2012/0093431 | A1* | 4/2012 | Liba ................. | G06T 7/403 382/260 |

* cited by examiner

*Primary Examiner* — Xiao Wu
*Assistant Examiner* — Steven Elbinger
(74) *Attorney, Agent, or Firm* — Faegre Baker Daniels LLP (57) ABSTRACT

An apparatus and methods for modifying gradation in an image frame determine a blend factor indicating a first weighting associated with a previously processed portion of the image frame. The apparatus and methods generate a weighted value associated with a current region of the image frame based on the current region of the image frame and based on applying the first weighting to the previously processed portion of the image frame so as to modify the gradation in the image frame.

21 Claims, 7 Drawing Sheets

MODIFYING GRADATION IN AN IMAGE FRAME INCLUDING APPLYING A WEIGHTING TO A PREVIOUSLY PROCESSED PORTION OF THE IMAGE FRAME

FIELD OF THE DISCLOSURE

The disclosure relates generally to image processing and more particularly to methods and apparatus for modifying gradation in an image.

BACKGROUND OF THE DISCLOSURE

Compression and other image and/or video processing techniques often introduce undesirable gradation into the image and/or video content being processed. In one common situation, areas of an image frame that are intended to appear smooth, such as portions of an image frame representing a clear sky and/or other flat areas that are relatively consistent in intended appearance, actually appear unsmooth or "blocky" after compression. Such "blocks" or other gradations in an image frame are sometimes referred to as false contours.

Conventional approaches to addressing blocky areas in an image frame include the use of complex detection capability in order to determine which areas of an image frame are blocky, and the use of two-dimensional spatial filters with very large support areas to modify those areas determined to be blocky. The use of such complex detection capability and spatial filters disadvantageously requires, among other things, a large number of calculations, significant memory bandwidth, etc. For example, for each pixel in an area of the image frame that is determined to be blocky, a conventional two-dimensional spatial filter applies coefficients to each of hundreds or even thousands of pixels in a large area surrounding that pixel. The results of multiplication of the coefficients by the hundreds or thousands of surrounding pixels may then be added to produce an output that is used to replace the original pixel in the blocky area. As noted above, these operations are performed for each pixel in the area of the image frame that is determined to be blocky. Performance of these operations is extremely computationally intensive, and the computational intensity of course increases with the number of blocky areas in an image frame.

Another conventional approach to addressing blocky areas in an image frame involves, after determining which areas are blocky, applying dither such as one or more noisy data sets to the blocky areas. However, this approach also involves expensive detection of which areas are blocky, such as by using complex detection logic as discussed above. Furthermore, the applied dither, while it may mask some blocky features of the image frame, introduces a form of new, false noise into the image frame. This newly introduced noise is frequently undesirable for other types of processing performed in image and/or video processing and/or decoding/encoding techniques.

BRIEF DESCRIPTION OF THE DRAWINGS

The embodiments will be more readily understood in view of the following description when accompanied by the below figures and wherein like reference numerals represent like elements, wherein.

DETAILED DESCRIPTION OF THE PREFERRED EMBODIMENTS

Briefly, methods and apparatus for modifying gradation in an image frame reduce the "blocky" appearance of one or more regions (e.g., one or more pixels) of an image frame, where the blocky appearance may result from compression or other image/video processing techniques. The methods and apparatus modify gradation in an image frame in any suitable device that processes and/or displays images and/or video, such as a mobile or smart phone, a phablet, a tablet, a camera, a laptop computer, portable media player, set-top box, gaming console, digital picture frame, or any other suitable device. In one embodiment, a method and an apparatus (e.g., a smart phone including a central or graphics processing unit (GPU) which in turn includes logic that is further described below) determine a blend factor indicating a first weighting (e.g., filter coefficient) associated with a previously processed portion of the image frame. The previously processed portion may be, for example, one or more previously processed pixels. The method and apparatus generate a weighted value associated with a current region (e.g., pixel) of the image frame based on the current region of the image frame and based on applying the first weighting to the previously processed portion of the image frame so as to modify the gradation in the image frame.

Among other advantages, for example, by modifying gradation in an image frame based on applying a first weighting to a previously processed portion of the image frame, the disclosed methods and apparatus avoid the need for the use of complex detection capability to identify blocky areas. Example ways of determining the blend factor indicating the first weighting are described below. The disclosed methods and apparatus also advantageously avoid the need for two-dimensional filters with large support areas to modify the identified blocky areas. For example, by using the blend factor and operating along a direction (e.g., processing in a one-dimensional manner), as further described below, the disclosed methods and apparatus avoid the need for extremely computationally-intensive and resource-intensive calculations. Other advantages will be recognized by one of ordinary skill in the art.

In one example, the blend factor may further indicate a second weighting (e.g., a second filter coefficient) associated with the current region of the image frame. The first weighting and the second weighting may be constrained to add up to 1.0 (or 100%) so that the first weighting and the second weighting indicate a distribution of how much of the previously processed portion of the image frame and the current region of the image frame, respectively, are incorporated into an output value, as further described below. Thus, generating the weighted value associated with the current region of the image frame may include applying the second weighting (e.g., filter coefficient) to the current region (e.g., pixel) of the image frame. When both the first weighting and the second weighting are non-zero, the weighted value associated with the current region, as determined in order to modify the gradation in the image frame, may therefore be a blend of the current region and the previously processed portion. Example techniques for determining the blend factor are further discussed below.

In another example, the methods and apparatus may apply noise to the image frame based on values associated with regions of the image frame after modifying the gradation in the image frame. Examples of applying noise to the image frame are further described below.

In yet another example, in addition to generating a weighted value associated with the current region of the image frame, the methods and apparatus may also generate weighted values associated with additional regions of the image frame that are along a direction that includes the current region of the image frame. In this manner, the methods and apparatus may perform one-dimensional (1-D) processing (e.g., filtering) of regions of the image frame. The processing may then be repeated for additional regions of the image frame, such as the regions in another horizontal row or vertical column of the image frame. After 1-D processing is completed for all horizontal or vertical rows or columns of the image frame, respectively, 1-D processing may then be performed for all vertical or horizontal columns or rows of the image frame, respectively, as further discussed below. The use of 1-D processing for rows and columns of the image frame, along with features such as the determined blend factor to allow the use of only two weightings (e.g., coefficients) for processing each region (e.g., pixel), may allow significant savings in computational resources.

In one example, the methods and apparatus may modify the gradation in the image frame in a second direction different from a first direction while modifying the gradation in the image frame in the first direction. For example, the methods and apparatus may contemporaneously process regions of the image frame that are in the same horizontal row by processing the row from left to right at the same time as the row is processed from right to left. The results may then be used to determine modified output image data by blending the results of filtering in each direction, selecting the result of one direction of filtering that is determined to include a better modification of gradation in the image frame, etc., as further described below.

In another example, the methods and apparatus may determine that a value associated with the current region of the image frame (e.g., a value of a pixel currently being evaluated) differs with respect to one or more values associated with the previously processed portion of the image frame by a threshold. The one or more values associated with the previously processed portion of the image frame may be a constant, may depend on modified output image data currently being generated by the methods and apparatus (e.g., by blending, as described above), may depend on regions surrounding the current regions (e.g., surrounding pixels), etc., as further described below.

In response to determining that the value associated with the current region of the image frame differs with respect to the one or more values associated with the previously processed portion by the threshold, the methods and apparatus may output the current region (e.g., current pixel) without any blending (e.g., without filtering). In this manner, as further discussed below, when an abrupt change in pixel value occurs that indicates, for example, the beginning of an object within the horizontal row (or vertical column) of the image being processed, the methods and apparatus will output the pixel value for the beginning of the object instead of performing blending as though the pixel at the beginning of the object is part of gradation (e.g., a false contour) in the image frame.

In some embodiments, the methods and apparatus may then determine that a value associated with a subsequent region in the image frame differs with respect to one or more values associated with the previously processed portion of the image frame by less than the threshold (e.g., indicating the end of the object in the horizontal row being processed). The methods and apparatus may then determine when a further subsequent region of the image frame is to blended with previously processed data for the image frame. For example, the methods and apparatus may begin using non-zero coefficients for both previously processed data for the image frame and for further subsequent regions of the image frame being evaluated, but it may take a number of blending operations (e.g., corresponding to 20-30 pixels along a row or column, in an embodiment) for the methods and apparatus to begin generating reliably blended (e.g., filtered) data that includes a desired modification of gradation in the image frame.

Among other advantages, the disclosed methods and apparatus may allow determination of a single blend factor, such as by example techniques described below, to be used to modify gradation in an image frame and thus remove blocky areas (e.g., by 1-D filtering) without computationally-intensive and resource-intensive calculations. Other advantages will be recognized by those of ordinary skill in the art.

Figure 1:
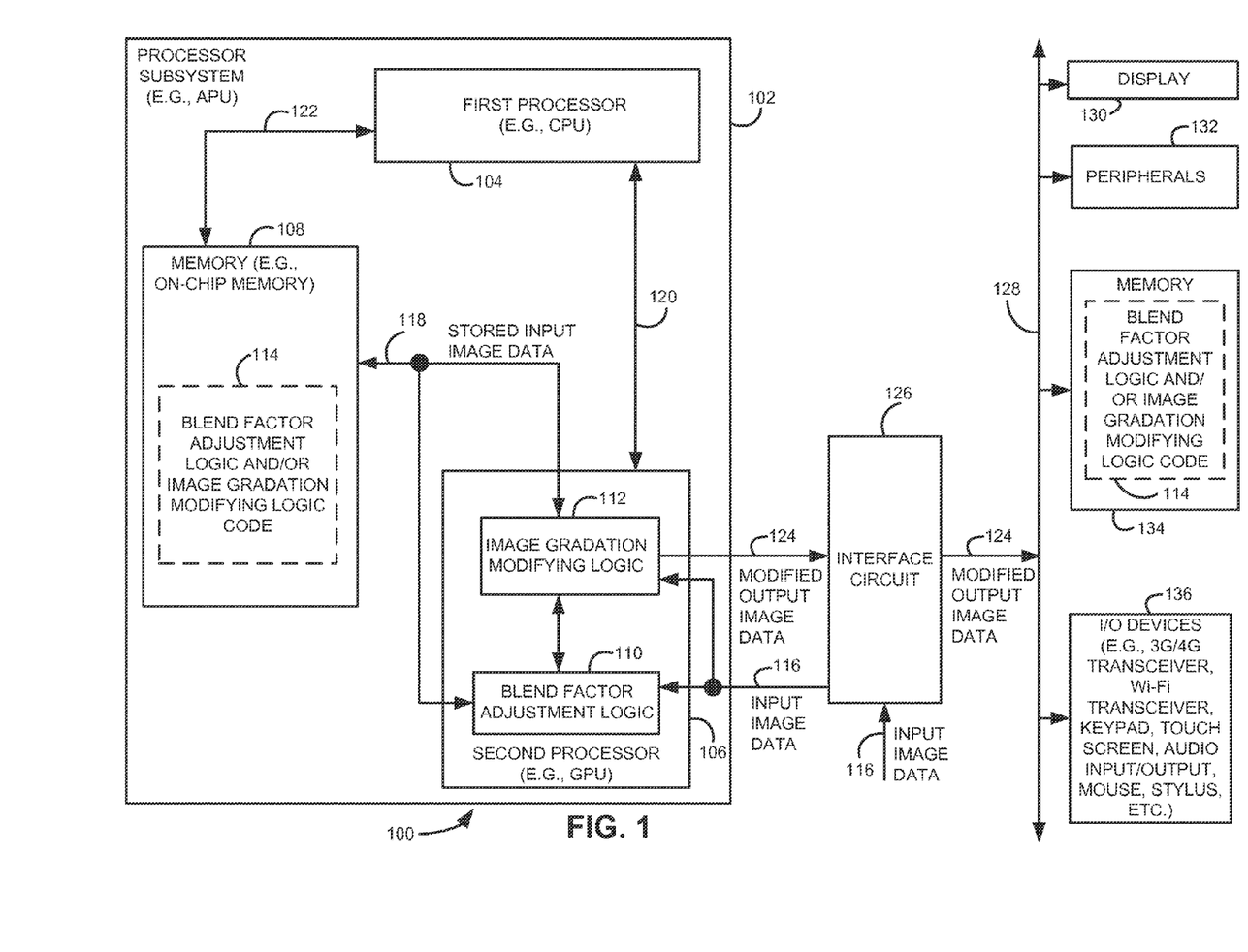
FIG. 1 is a functional block diagram illustrating an example apparatus including blend factor adjustment logic and image gradation modifying logic which may be associated with a processor, such as, for example, a graphics processing unit (GPU) to modify gradation in an image frame.

FIG. 1 is a functional block diagram illustrating an example apparatus 100 including blend factor adjustment logic and image gradation modifying logic which may be associated with a processor, such as, for example, a GPU to modify gradation in an image frame. The apparatus 100 may be, for example, any suitable device that processes and/or displays images and/or video, such as a mobile or smart phone, a phablet, a tablet, a camera, a laptop computer, portable media player, set-top box, gaming console, digital picture frame, or any other suitable device.

As illustrated in FIG. 1, the example apparatus 100 includes a processor subsystem 102, which includes a first processor 104 such as a central processing unit (CPU), a second processor 106 such as a GPU, and a memory 108 such as an on-chip memory. Either processor 104 or the second processor 106 may include blend factor adjustment logic 110 and image gradation modifying logic 112. In an embodiment described below image gradation modifying logic 112 is included in second processor 106. As will be appreciated a singular processor incorporating the functionality of processor 104 and processor 106 can also be implemented in various embodiments of the present invention.

In some embodiments, the processor subsystem 102 may be an accelerated processing unit (APU), which as known in the art includes one or more CPU cores and one or more GPU cores on the same die. Such an APU may be, for example, an APU as sold by Advanced Micro Devices, Inc. (AMD) of Sunnyvale, Calif. Alternatively, one or more of the first and second processors 104 and 106 may perform general-purpose computing on GPU (GPGPU), may include one or more digital signal processors (DSPs), one or more application-specific integrated circuits (ASICs), or the first and second processors 104 and 106 may be any suitable processors.

In some examples, the described blend factor adjustment logic 110, and/or the image gradation modifying logic 112 and/or other logic described herein, may be implemented by executing suitable instructions on, for example, the first processor 104 and/or the second processor 106. In other examples, the described blend factor adjustment logic 110, and/or the image gradation modifying logic 112, and/or other logic described herein may be implemented by storing executable instructions on a computer readable storage medium, where the executable instructions are executable by one or more processors (e.g., the first processor 104 and/or the second processor 106) to cause the one or more processors to perform the actions described herein. For example, executable instructions may be stored in the memory 108 or any suitable memory and may include blend factor adjustment logic and/or image gradation modifying logic code 114. The described blend factor adjustment logic 110, and/or the image gradation modifying logic 112, and/or other logic described herein, may also be implemented in any other suitable manner such as but not limited to a firmware implementation, a hardware implementation, or any suitable combination of the example implementations described above.

Figure 2:
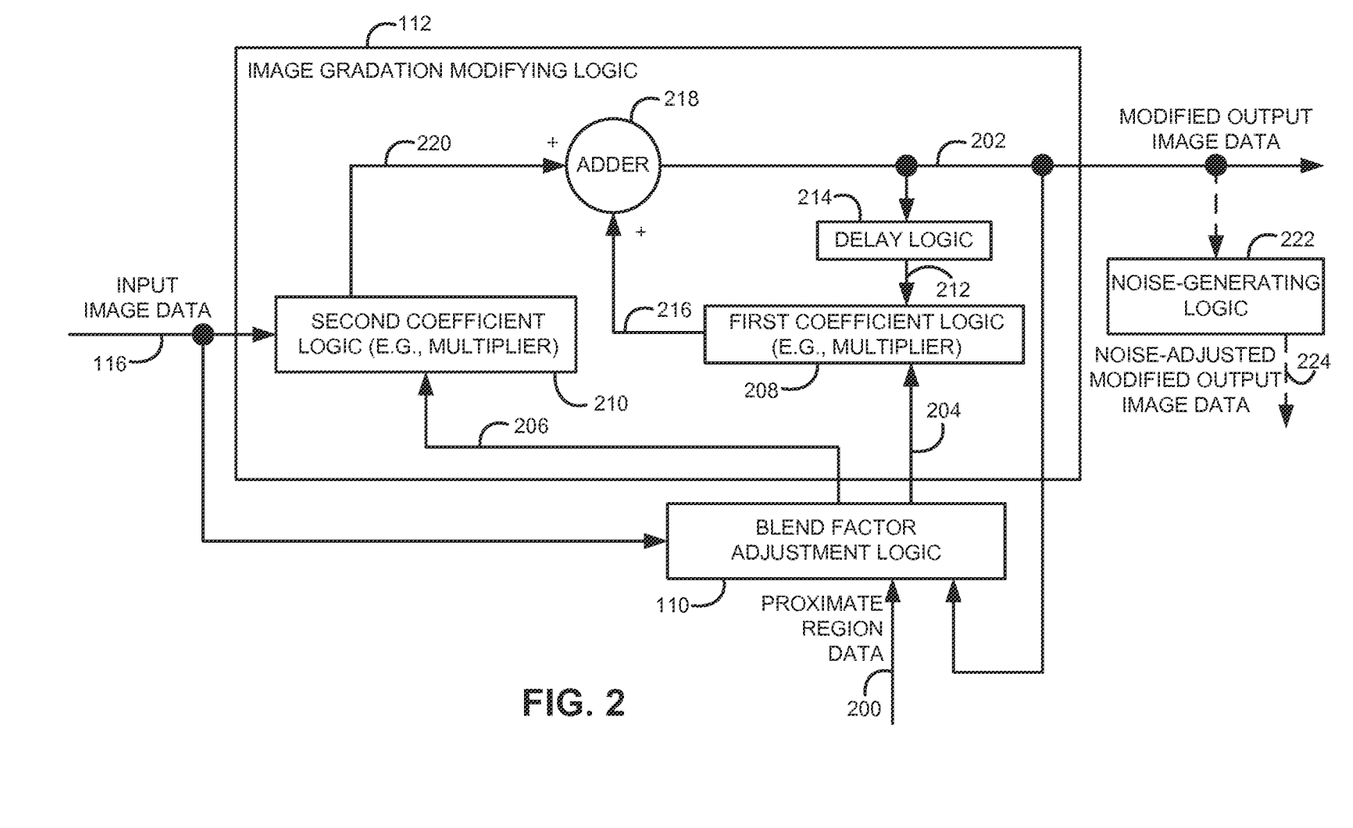
FIG. 2 is a functional block diagram illustrating an example of further detail of the operation of the blend factor adjustment logic and the image gradation modifying logic.

As further discussed with respect to FIG. 2 and subsequent figures, the blend factor adjustment logic 110 determines a blend factor indicating a first weighting (e.g., first filter coefficient) associated with a previously processed portion of the image frame. As further described below, the first weighting may be determined based on various factors including a relationship of a value associated with a current region of the image frame to a threshold. Moreover, the first weighting may in some cases be zero. The image gradation modifying logic 112 may then modify gradation (e.g., reduce "blockiness") in the image frame by generating a weighted value associated with the current region of the image frame being processed, based on the current region and based on applying the first weighting to the previously processed portion of the image frame.

As shown in FIG. 1, the second processor 106 may receive input image data 116 containing gradation to be modified. In another embodiment, the second processor 106 may receive the image data containing gradation to be modified by receiving stored input image data 118, such as from the memory 108 as shown. In yet another embodiment, the second processor 106 may receive the image data containing gradation to be modified from the first processor 104 over a communication link 120. The first processor 104, in turn, may have received the image data that it communicates over the communication link 120 from the memory 108 via a communication link 122. In still another embodiment, the first processor 104 may receive the image data containing gradation to be modified and may itself perform the processing that is described herein, for purposes of example, as being performed by the second processor 106.

Returning to the example in which the second processor 106 receives the input image data 116, the stored input image data 118, etc., as described above and performs processing to modify gradation in an image frame, the second processor 106 may generate modified output image data 124 that is provided to an interface circuit 126 (e.g., a northbridge and/or a southbridge). The interface circuit 124 may in turn provide the modified output image data 124 to an expansion bus 128. Moreover, when the second processor 106 receives the input image data 116, the input image data 116 may be received from an external source (e.g., another apparatus) via the interface circuit 126, or from any suitable source.

The expansion bus 128 may further connect to, for example, a display 130; one or more peripheral devices 132; an additional memory 134 and one or more input/output (I/O) devices 136. Thus, for example, after modifying the gradation in an image frame, the GPU may provide the image frame (e.g., modified output image data) for display on the display 130 and/or to any other suitable devices via, for example, the expansion bus 128. If desired, executable instructions including the blend factor adjustment logic and/or image gradation modifying logic code 114 may be stored in the additional memory 134 in addition to or instead of being stored in the memory 108. The one or more I/O devices 136 may include, for example, one or more cellular transceivers such as a 3G or 4G transceiver; a Wi-Fi transceiver; a keypad; a touch screen; an audio input/output device or devices; a mouse; a stylus; and/or any other suitable input/output device(s).

FIG. 2 is a functional block diagram illustrating an example of further detail of the operation of the blend factor adjustment logic 110 and the image gradation modifying logic 112. The blend factor adjustment logic 110 receives proximate region data 200 associated with one or more regions, such as one or more neighboring pixels, proximate to the current region (e.g., pixel) of the image frame being processed. The image gradation modifying logic 112 generates modified output image data 202, as further described below, and the modified output image data 202 is also provided to the blend factor adjustment logic 110. Furthermore, the input image data 116 (or stored input image data 118 or other suitable image data received for processing, as discussed above) is also input to the blend factor adjustment logic 110. As discussed in further detail below, the blend factor adjustment logic 110 may use the received data 116, 200, and 202 to determine a blend factor indicating a first weighting associated with the previously processed portion of the image frame. The first weighting may be represented by first coefficient data 204. The blend factor may further indicate a second weighting associated with the current region of the image frame being processed, where the second weighting may be represented by second coefficient data 206. As shown in FIG. 2, the first coefficient data 204 and the second coefficient data 206 are provided to first coefficient logic (e.g., a multiplier) 208 and second coefficient logic (e.g., a multiplier) 210, respectively.

The first coefficient logic 208 multiplies a first weighting (e.g., a first infinite impulse response (IIR) filter coefficient) represented by the first coefficient data 204 by previously processed portion data 212 representing the previously processed portion of the image frame. As shown in FIG. 2, the previously processed portion data 212 is a delayed version of the modified output image data 202, and may be generated by delay logic 214, such as delay logic that implements a one-clock-cycle delay. The product of the multiplication performed by the first coefficient logic 208 is provided as weighted previously processed portion data 216 to an adder 218. Additionally, the second coefficient logic 210 multiplies a second weighting (e.g., a second infinite impulse response (IIR) filter coefficient) represented by the second coefficient data 206 by a value associated with a current region of the image frame (e.g., a value associated with a current pixel being processed) as indicated by the input image data 116. The product of the multiplication performed by the second coefficient logic 210 is provided as weighted current region data 220 to the adder 218.

The adder 218 adds the weighted previously processed portion data 216 and the weighted current region data 220 to generate the modified output image data 202. The modified output image data 202 is or includes a weighted value associated with the current region of the image frame. By the above-described operation, the blend factor adjustment logic 110 and the image gradation modifying logic 112 may thus blend the current region and the previously processed portion of the image frame when both the first and second coefficients are non-zero. In this manner, the blend factor adjustment logic 110 and the image gradation modifying logic 112 may process a horizontal row (or vertical column) of pixels in a 1-D manner, such as by beginning with the leftmost pixel in a row. In such an example, the first coefficient may be set to zero because there are no previously processed pixels in the row. The second coefficient may be set to one (i.e., 1.0, or, equivalently, 100%) so that the leftmost pixel is output without change (e.g., without blending) because there are no previously processed pixels in the row to blend the leftmost pixel with when processing from left to right.

For the next (e.g., second-from-left) pixel in the row, the first coefficient may be set to a suitable non-zero value that may be determined based on the input data 116, 200, and 202, and may also be determined based on, for example, the particular application for which image processing is being performed, based on a user or manufacturer setting, or based on any other desired and/or suitable criteria. The second coefficient may then be set accordingly so that the first and second coefficients continue to add up to one (1.0), and the setting of the first and second coefficients may continue as each subsequent pixel in the horizontal row is treated as the "current region" and thus has, for example, its value multiplied by the second coefficient for image processing purposes. Accordingly, and as further described below, each pixel currently being processed may be blended with the pixel(s) before it in a horizontal row (or vertical column), and gradation may be modified (e.g., reduced) as a result, without the need for complex detection logic or 2-D filters with large support areas that consider hundreds or even thousands of neighboring pixels.

As shown in FIG. 2 and as further described below, the modified output image data 202 may be provided to noise-generating logic 222, which may, for example, apply a degree of "noise" or dither to the modified output image data 202 in order to further desirably modify the gradation in the image frame. The noise may be less than that applied using conventional techniques without using the 1-D filtering technique disclosed herein and may thus minimize the aforementioned drawbacks associated therewith. The noise may be, for example, a stored noisy data set and may be selectively applied to areas of discontinuity in the image frame after all of the modified output image data 202 for the image frame is generated. For example, where an area of the modified image frame includes pixels with magnitude 101 adjacent to pixels with magnitude 100, the stored noisy data set may be applied to those pixels in order to further mask the difference in pixel magnitudes and thus further reduce any blocky appearance remaining after image processing using the techniques disclosed herein. The applied noise may in other cases be quasi-random noise generated by a device such as a linear feedback shift register (LFSR), or any suitable noise or dither that may further mask any blockiness in the modified output image data 202. The noise-generating logic 222 may thus output noise-adjusted modified output image data 224.

Figure 3:
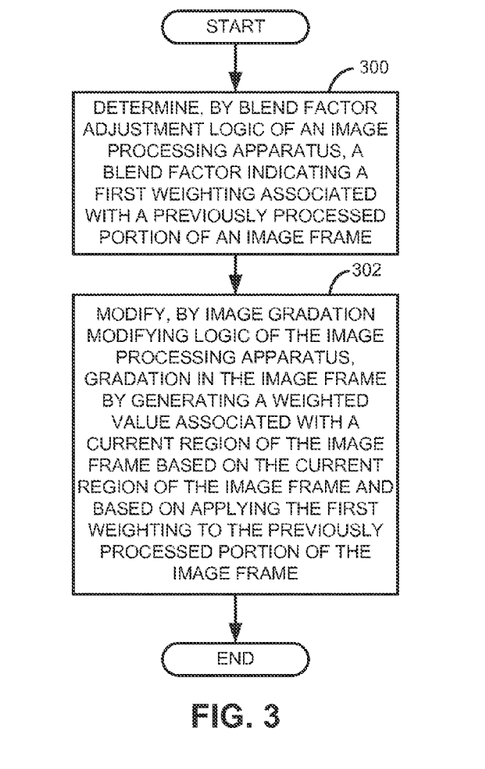
FIG. 3 is a flowchart of an example method for modifying gradation in an image frame.

With continued reference to FIG. 2 and turning also to FIG. 3, FIG. 3 is a flowchart of an example method for modifying gradation in an image frame. The method illustrated in FIG. 3, and each of the example methods described herein, may be carried out by one or more suitably programmed controllers or processors executing software (e.g., by the second processor 106 executing suitable instructions). The method may also be embodied in hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the method(s) is/are described with reference to the illustrated flowcharts (e.g., in FIG. 3), it will be appreciated that many other ways of performing the acts associated with the method(s) may be used. For example, the order of some operations may be changed, and some of the operations described may be optional. Additionally, while the method(s) may be described with reference to the example apparatus 100, it will be appreciated that the method(s) may be implemented by other apparatus as well, and that the apparatus 100 may implement other methods.

As shown in FIG. 3, the method begins at block 300 when blend factor adjustment logic of an image processing apparatus (e.g., the example apparatus 100 with second processor (e.g., GPU) 106) determines a blend factor indicating a first weighting associated with a previously processed portion of an image frame. For example, the blend factor adjustment logic 110 may determine the blend factor in accordance with one or more of the example techniques described above during 1-D processing (e.g., filtering) of a horizontal row or vertical column of pixels.

As shown in block 302, image gradation modifying logic, such as the image gradation modifying logic 112, then modifies the gradation in the image frame by generating a weighted value associated with a current region of the image frame based on the current region of the image frame (e.g., based on multiplying a value associated with a current pixel being processed by a second weighting, as discussed with respect to FIG. 2) and based on applying the first weighting to the previously processed portion of the image frame.

Figure 4:
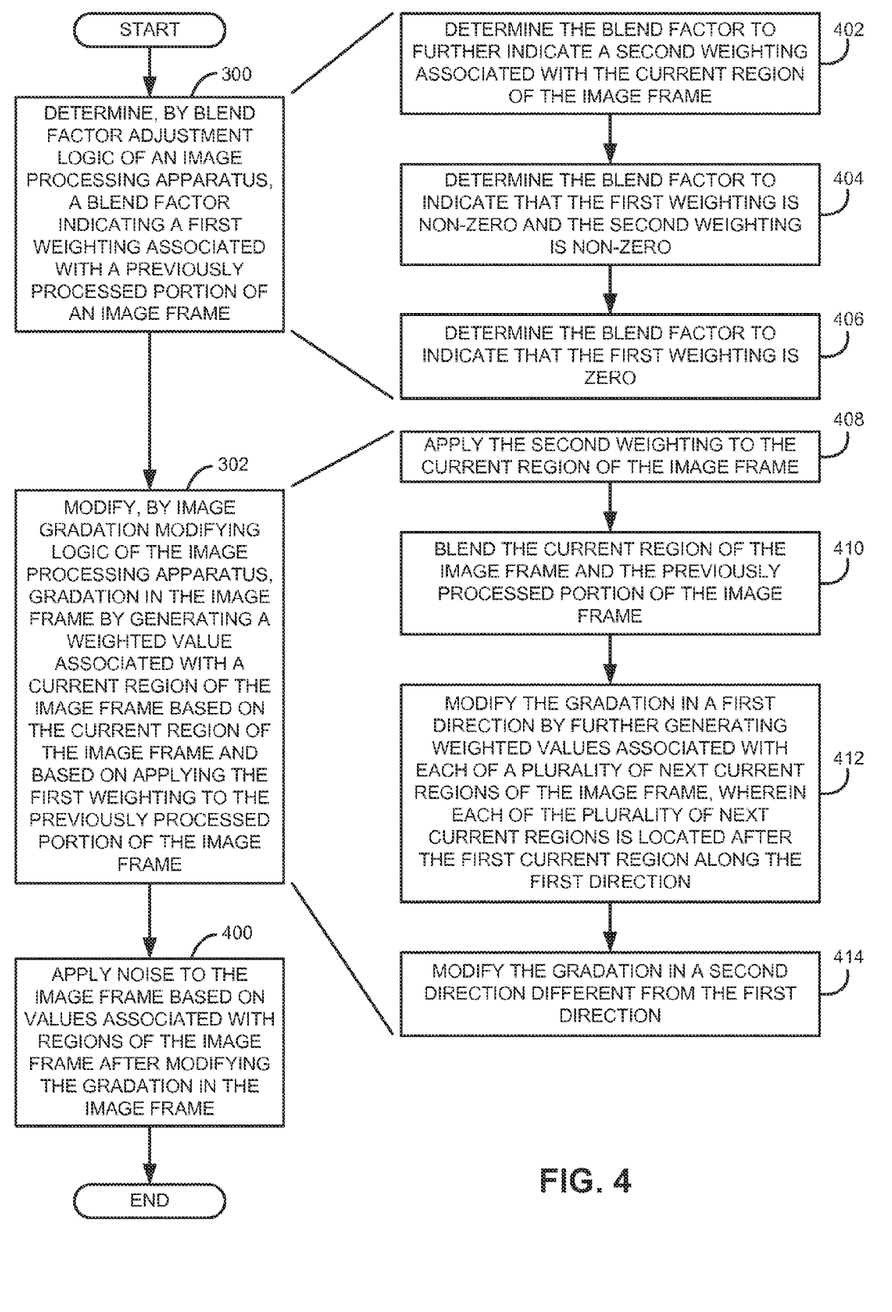
FIG. 4 is a flowchart of another example method for modifying gradation in an image frame and includes aspects of the method illustrated in FIG. 3 in more detail.
Figure 5:
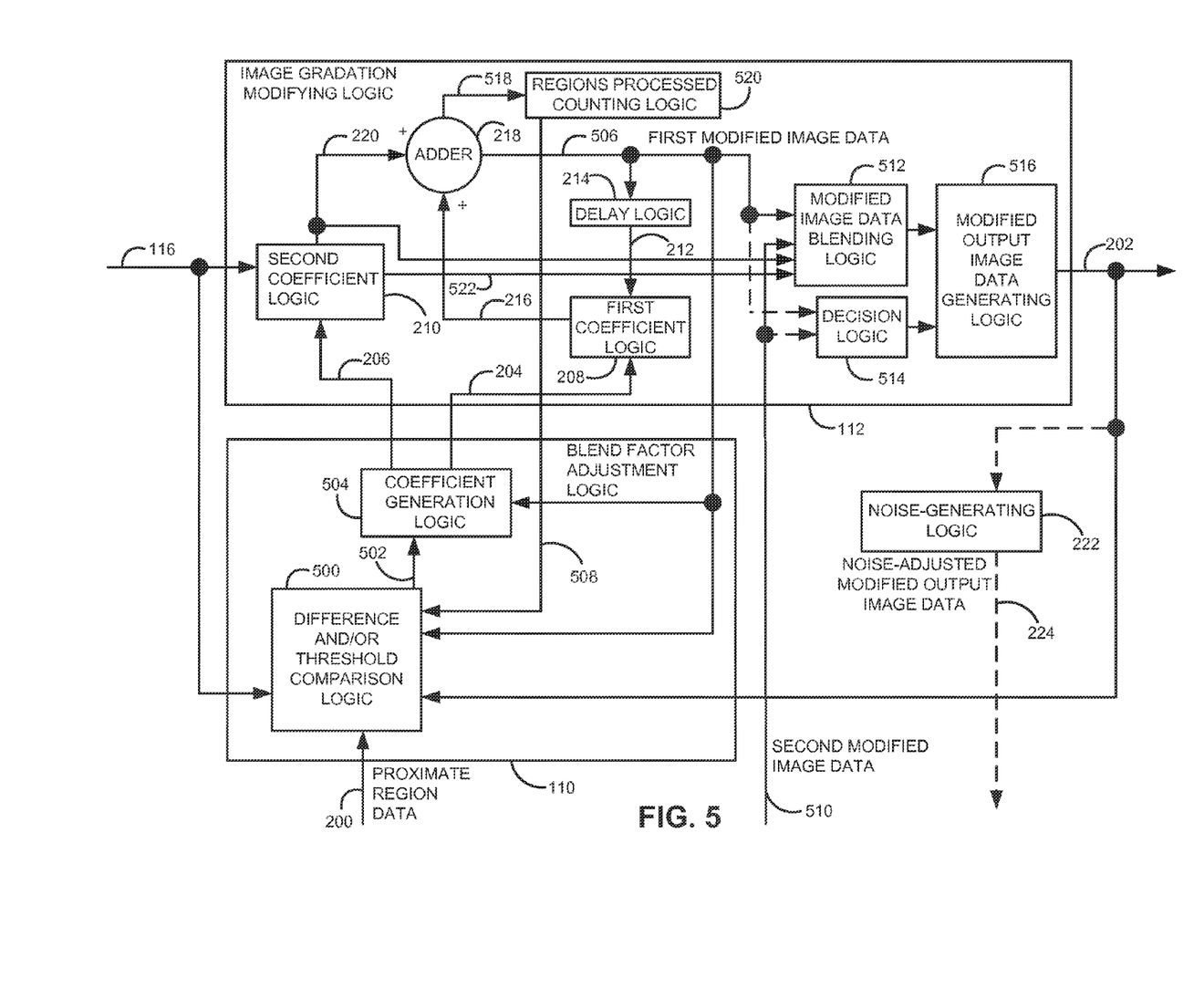
FIG. 5 is a functional block diagram illustrating an example of still further detail of the operation of the blend factor adjustment logic and the image gradation modifying logic.

Turning now to FIGS. 4 and 5, FIG. 4 is a flowchart of another example method for modifying gradation in an image frame and includes aspects of the method illustrated in FIG. 3 in more detail. FIG. 5, which will be discussed in conjunction with FIG. 4, is a functional block diagram illustrating an example of still further detail of the operation of the blend factor adjustment logic 110 and the image gradation modifying logic 112.

As shown in FIG. 4 in block 300, and as described with respect to FIG. 3, the method may include blend factor adjustment logic of an image processing apparatus determining a blend factor indicating a first weighting associated with a previously processed portion of an image frame. As with FIG. 3, the method may also include, in block 302, modifying, by image gradation modifying logic, gradation in the image frame by generating a weighted value associated with a current region of the image frame based on the current region of the image frame and based on applying the first weighting to the previously processed portion of the image frame. Furthermore, as shown in block 400, the method may include applying noise to the image frame based on values associated with regions of the image frame after modifying the gradation in the image frame, as discussed above. As further discussed above, the noise may be applied over an area of discontinuity in, for example, pixel magnitude that exists despite the modification of the gradation in the image frame.

With more particular reference to FIG. 4, in an example, performing the acts described with respect to block 300 may include determining the blend factor to further indicate a second weighting associated with the current region of the image frame (block 402). For example, the blend factor may further indicate a second coefficient, as described above. Additionally, as shown in block 404, the method may include determining the blend factor to indicate that the first weighting is non-zero and the second weighting is non-zero. In this manner, as discussed above and as further described below, the current region of the image frame (e.g., a pixel of a horizontal row or vertical column that is currently being processed) may be blended with the previously processed portion of the image frame (e.g., the portion of the image frame including pixels of the same horizontal row or vertical column that have already been processed/filtered in the manner described herein).

Alternatively, as shown in block 406, the method may include determining the blend factor to indicate that the first weighting is zero. Turning to FIG. 5, as shown in an example implementation of the blend factor adjustment logic 110, the blend factor adjustment logic 110 includes difference and/or threshold comparison logic 500 that outputs a coefficient generation signal 502 to coefficient generation logic 504. The difference and/or threshold comparison logic 500 receives the input image data 116, the proximate region data 200, first modified image data 506 (which, as described below, may in some cases be the same as the modified output image data 202), a regions processed count 508, and the modified output image data 202 (in some cases, only if the modified output image data 202 differs from the first modified image data 506 as described below). Alternatively, in some embodiments, instead of receiving the modified output image data 202, the difference and/or threshold comparison logic 500 may in some cases receive the noise-adjusted modified output image data 224 when the noise-generating logic 222 is implemented.

The difference and/or threshold comparison logic 500 may output the coefficient generation signal 502 so that the coefficient generation signal 502 indicates whether a value associated with a current region of the image frame (e.g., a value of a pixel of the image frame currently being processed) differs with respect to one or more values associated with the previously processed portion of the image frame (e.g., the previously processed portion data 212) by a threshold amount (or more than the threshold amount). In some embodiments, when the coefficient generation signal 502 indicates that this difference is at or above the threshold amount, the blend factor is determined to indicate that the first weighting is zero. As a result, the current region (e.g., pixel) of the image frame that is being processed will be output without having its value changed (e.g., without blending the current region of the image frame and the previously processed portion of the image frame). Outputting the current region (e.g., pixel) without blending may be desirable upon an abrupt change in pixel value relative to, for example, a previously processed/filtered region because such an abrupt change may be indicative of the beginning of a distinct object in the image frame. Because the distinct object is essentially a form of gradation in the image frame that is desired, it may be desirable not to blend a pixel corresponding to the distinct object. A specific example of encountering a distinct object is discussed further below.

In order to process an entire image frame, the actions discussed with respect to blocks 300 and 302 of FIG. 3 may be repeated for each horizontal row (or vertical column) of the image frame. The modified output image data 202 for each of the horizontal rows (or vertical columns) of the image frame may then be stored in memory, such as the memory 108, the additional memory 134, or any suitable memory, and retrieved for processing of each of the vertical columns (or horizontal rows), as the case may be, in order to complete processing and modifying of gradation in the entire image frame. As discussed above, the modified image frame may then be provided, for example, for display on the display 130, to one of the I/O devices 136, or may be utilized, stored, provided, etc. in any suitable manner.

Before discussing further examples of using information such as the information received by the difference and/or threshold comparison logic 500 to output the coefficient generation signal 502 and thus ultimately determine the blend factor, the actions discussed with respect to block 302 will be described in further detail. As shown in FIG. 4, the method further includes, as shown in block 408, applying the second weighting to the current region of the image frame. As shown in block 410, the method may include blending the current region of the image frame and the previously processed portion of the image frame using the non-zero first coefficient and the non-zero second coefficient, as discussed above. As shown in block 412, the method may also include modifying the gradation in a first direction (e.g., along a given horizontal row or vertical column of the image frame) by further generating weighted values associated with each of a plurality of next current regions of the image frame.

Furthermore, as shown in block 414, the method may include modifying the gradation in a second direction different from the first direction. For example, as discussed above, the method may include modifying the gradation in a vertical direction after modifying gradation of each horizontal row, or vice-versa. In some embodiments, the actions described with respect to block 414 may also or alternatively include modifying the gradation in a direction opposite to the first direction while modifying gradation in the first direction. For example, the method may include modifying the gradation in a particular horizontal row of pixels from left to right while also modifying the gradation in the same particular horizontal row of pixels from right to left. Modifying gradation in opposite directions during the same time or even simultaneously may reduce phase delay, which may result, for example, when blending continues during transitions between features in an image frame, e.g., when blending continues at the location of an edge between two features. The blending may cause a more gradual transition between pixel values than if blending were not employed. However, blending (e.g., filtering) from a direction opposite to the first direction while blending from the first direction may have the desirable effect of making such a transition less gradual in the modified image frame that is eventually output. In situations where such opposite processing is employed, a similar procedure of processing each horizontal row (or vertical column) and then processing each vertical column (or horizontal row) may be employed.

With reference to FIG. 5, implementation of blending along a first direction at the same time as blending along a second direction will be further described. As shown in FIG. 5, second modified image data 510 may be received from second image gradation modifying logic (not shown, and which may be in communication with second blend factor adjustment logic (also not shown)). In particular, the second modified image data 510 may be modified output image data resulting from modifying gradation in the image frame along a direction opposite to a first direction along which the blend factor adjustment logic 110 and the image gradation modifying logic 112 (and in some cases, the noise-generating logic 222) are used to modify the gradation in the image frame. Alternatively, the blend factor adjustment logic 110 and the image gradation modifying logic 112 may process the input image data 116 in the direction opposite to the first direction while processing the input image data 116 in the first direction, and thus the image gradation modifying logic 112 may generate the second modified image data 510 in addition to generating the first modified image data 506. In any event, the first modified image data 506 and the second modified image data 510 may be input to modified image data blending logic 512. In another embodiment, the first modified image data 506 and the second modified image data 510 may be input to decision logic 514.

In the event that the first modified image data 506 and the second modified image data 510 are input to the modified image data blending logic 512, the modified image data blending logic 512 may blend the first modified image data 506 and the second modified image data 510 in any of a number of suitable ways. For example, the first and second modified image data 506 and 510 may be blended based on the accumulation length in each direction. That is, for example, if blending (e.g., filtering) has been performed for a larger number of regions (e.g., pixels) in the first direction than in the direction exactly opposite to the first direction, the first modified image data 506 corresponding to the result of this greater amount of blending may be given greater significance when blending the first and second modified image data 506 and 510 together. Similarly, if blending in one direction results in encountering an edge (e.g., a notable or abrupt change in pixel value, such as by at least a certain absolute amount or at least a certain percentage), the modified image data 506 or 510 that more closely corresponds to the edge may be favored in the blending in order to ensure that the contrast associated with the edge is rendered as accurately as possible in the output modified image frame. In other situations, the first and second modified image data 506 and 510 may be averaged or may be blended in any other suitable manner.

In other embodiments, as discussed above, the first and second modified image data 506 and 510 may be input to the decision logic 514. The decision logic 514 may select one of the first and second modified image data 506 and 510 to be output as the modified output image data 202, and thus has the effect of discarding the one of the first and second modified image data 506 and 510 that is not selected. The decision logic 514 may select the one of the first and second modified image data 506 and 510 according to, for example, criteria such as those used above to determine which of the first and second modified image data 506 and 510 to give greater significance to during blending, and/or according to any other suitable criteria. In either case, modified output image data generating logic 516 may receive the output of either the modified image data blending logic 512 or the decision logic 514 and pass that output through to the output of the modified output image data generating logic 516 as the modified output image data 202. In other embodiments, the modified output image data generating logic 516 may be omitted and the output of the modified image data blending logic 512 or the output of the decision logic 514 may be used in accordance with which of the modified image data blending logic 512 and the decision logic 514 received the first and second modified image data 506 and 510.

As noted above in the discussion of block 300 and, more particularly, blocks 402, 404, and 406, FIG. 5 illustrates the use of information received by the difference and/or threshold comparison logic 500 to output the coefficient generation signal 502 to the coefficient generation logic 504. The coefficient generation signal 502 may be indicative of the blend factor, or in another embodiment the blend factor may be determined by the coefficient generation logic 504 based on the coefficient generation signal 502, and may be used by the coefficient generation logic 504 to generate the first and second coefficient data 204 and 206 representative of the first weighting and second weighting (e.g., first coefficient and second coefficient). The use of received information by the difference and/or threshold comparison logic 500 will now be described in greater detail.

As shown in the example of FIG. 5, the difference and/or threshold comparison logic 500 receives the input image data 116, the proximate region data 200, the regions processed count 508, the first modified image data 506, and the modified output image data 202. Other suitable information may also or alternatively be received. For example, where the noise-generating logic 222 is implemented, the difference and/or threshold comparison logic 500 may also or alternatively receive the noise-adjusted modified output image data 224. The difference and/or threshold comparison logic 500 may use the received data to generate and output the coefficient generation signal 502 for determination of the blend factor based on, for example, a difference of a value associated with the current region (e.g., current pixel value) with respect to one or more values associated with the previously processed portion (e.g., a value of the first modified image data 506 or a value of a neighboring pixel after the neighboring pixel has already been processed (e.g., filtered) as indicated by the proximate region data 200). As discussed above, in one example, if the difference exceeds a threshold, the first coefficient logic 208 may determine the first weighting (e.g., first IIR filter coefficient) to be zero so that the current region (e.g., pixel) is output with no blending.

In other examples, the difference and/or threshold comparison logic 500 may generate and output the coefficient generation signal 502 based on a relationship between one or more values associated with the current region (e.g., a current pixel value) and one or more values associated with one or more regions of the image frame in proximity to the current region (e.g., neighboring pixel values, which may or may not be blended values depending on, for example, the direction in which the blending is proceeding). For example, the current pixel value may be evaluated with respect to one or more neighboring pixels by determining sums of absolute difference, gradients, variances, and/or other suitable mathematical constructs. The results of such determinations may then be used to generate the coefficient generation signal 502.

In still other examples, the difference and/or threshold comparison logic 500 may generate and output the coefficient generation signal 502 based on the regions processed count 508, which may be a count of the number of regions of the image frame, or in the particular horizontal row or vertical column being processed, that have been processed (e.g., filtered) in modifying the gradation in the image frame. To determine the regions processed count 508, the adder may assert an add operation signal 518 to regions processed counting logic 520, which may increment a count of the number of regions processed each time the add operation signal 518 is asserted. The regions processed counting logic 520 may thereby generate and output the regions processed count 508. Among other suitable uses for the regions processed count 508, the regions processed count 508 may indicate how much processing has been performed along a first direction, which may be useful in determining how to blend the first and second modified image data 506 and 510 as discussed above in cases where processing is also (e.g., concurrently or simultaneously) being performed in a direction opposite the first direction.

Furthermore, in some embodiments, after determining that a value associated with a current region of the image frame differs with respect to one or more values associated with the previously processed portion of the image frame (e.g., the first modified image data 506) by a threshold amount (and, for example, outputting the coefficient generation signal 502 accordingly), the difference and/or threshold comparison logic 500 may determine that a value associated with a subsequent region (e.g., after the current region being processed) differs with respect to the one or more values associated with the previously processed portion of the image frame by less than the threshold amount. This determination that the difference with respect to the subsequent region is less than the threshold amount may indicate, for example, that the feature in the image frame that caused the difference with respect to the current region to be at or above the threshold is no longer present. That is, this determination may indicate that the processing of, for example, a horizontal row of pixels along a first direction has reached the point along the first direction at which the feature ends. A specific example of such a feature is shown and described with respect to FIG. 6.

In response to determining that the difference with respect to the subsequent region is less than the threshold amount, the difference and/or threshold comparison logic 500 may determine when a further subsequent region (e.g., along the first direction) is to be blended with a subsequent previously processed portion of the image frame. For example, once it is determined that the difference with respect to the subsequent region is less than the threshold amount, the blend factor adjustment logic 110 and image gradation modifying logic 112 may resume processing of subsequent regions (e.g., subsequent pixels along the first direction in the horizontal row or vertical column) with non-zero first and second weightings (e.g., coefficients), but the image gradation modifying logic 112 may continue to output each subsequent region without any blending for a particular time in order to allow the results of blending to again reliably produce image data with modified gradation. That is, for the first several subsequent regions, blending operations will produce results that vary relatively significantly from one result to the next because only several subsequent regions have been accounted for in the resumed blending.

Thus, the coefficient generation logic 504 may generate the first coefficient data 204 to represent the first weighting as a non-zero weighting, and the coefficient generation logic 504 may generate the second coefficient data 206 so as to also represent the second weighting as non-zero. The coefficient generation logic 504 may also, however, generate the second coefficient data 206 so as to cause to second coefficient logic 210 to assert a no-blending signal 522 to the modified image data blending logic 512. As further shown in FIG. 5, the weighted current region data 220 is also provided to the modified image data blending logic 512. The modified image data blending logic 512 may be configured to pass the weighted current region data 220 through to its output when the no-blending signal 522 is asserted. In situations where the second modified image data 510 is also provided or generated as discussed above, second weighted current region data (not shown) corresponding to a second region currently being processed (e.g., from the opposite direction) may also be provided to the modified image data blending logic 512.

The modified image data blending logic 512 may generate its output accordingly, e.g., by blending the weighted current region data 220 (which itself is unblended, as discussed above) and the second weighted current region data (which is also unblended). In this manner, the modified output image data 202 does not incorporate blending of any current region being processed with previously processed portion(s) of an image frame, but subsequent previously processed portion data is nonetheless generated. For example, the previously processed portion data 212 is nonetheless updated based on the additional processing of current regions of the image frame because both the first coefficient and the second coefficient are non-zero, as discussed above.

Among other advantages of these features of the method and apparatus, the previously processed portion data 212 may be updated but not used in determining the first modified image data 506 (or the second modified image data 510) for a particular number of subsequently processed regions. The particular number of subsequently processed regions may be determined based on a user or manufacturer setting. In one example, the particular number of subsequently processed regions for which the previously processed portion data 212 is not used in determining the first modified image data 506 may depend on how much the previously processed portion data 212 changes with each subsequently processed current region (or regions in the case of processing in, for example, a first direction and a direction opposite to the first direction at the same time).

For example, when the previously processed portion data 212 changes by less than a threshold amount, which may be user determined, dependent upon the pixel value of the current region (or average pixel value of the current regions in the case of processing in two directions at the same time), etc., this may indicate that the previously processed portion data 212 has incorporated a sufficient amount of blending of data within the image frame since the time the first weighting (e.g., coefficient) became non-zero again. For example, the previously processed portion data 212 may have incorporated a sufficient amount of blending of data after 20-30 pixels have been processed since the time the first weighting became non-zero.

Once the previously processed portion data 212 changes by less than the threshold amount or otherwise indicates sufficient blending, the no-blending signal 522 may be de-asserted, and the first modified image data 506 (and second modified image data 510, if present) may each once again be a blend of a current region and of a previously processed portion of the image frame.

Figure 6:
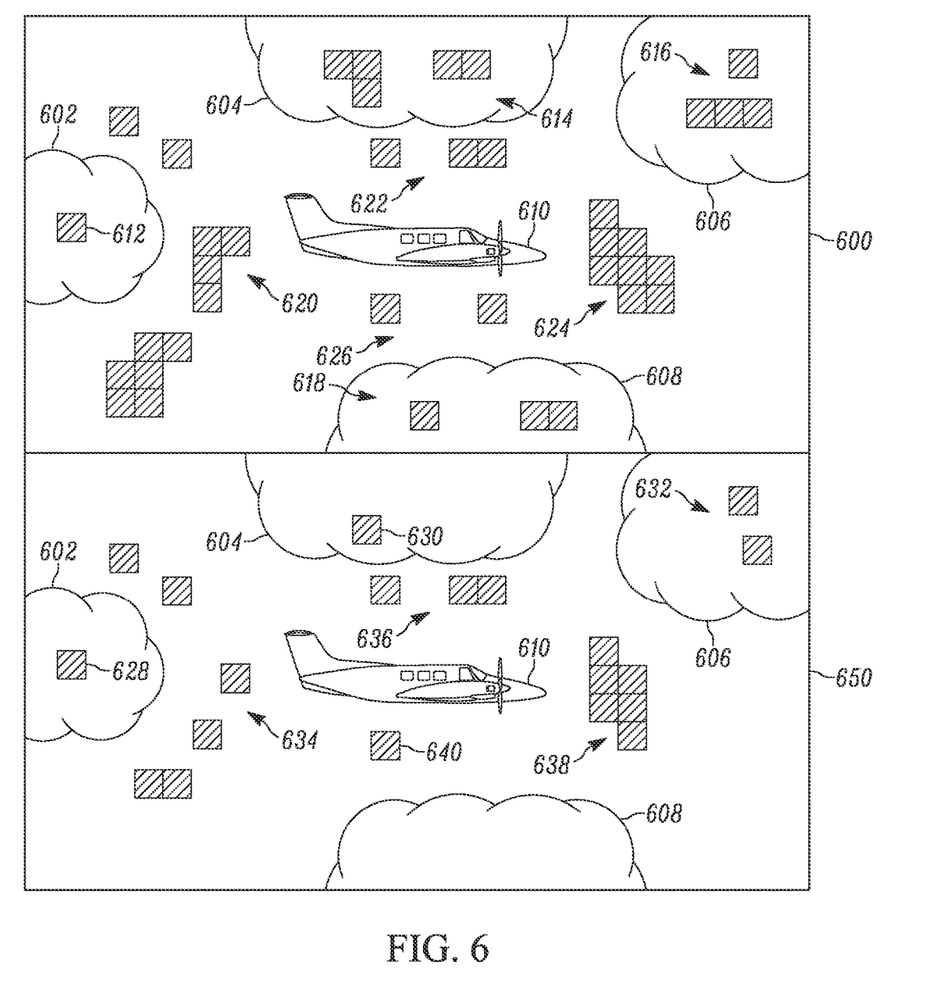
FIG. 6 illustrates an example of an image frame before processing to modify gradation in the image frame and an example of the image frame after processing to modify gradation in the image frame.

Turning to FIG. 6, FIG. 6 illustrates an example first image frame 600 before processing (e.g., filtering) using the disclosed methods and apparatus. The first image frame 600 shows clouds 602, 604, 606, and 608, and an airplane 610. The first image frame 600 also includes a blocky region 612 (represented by hatching) inside the cloud 602, a group of blocky regions 614 inside the cloud 604, a group of blocky regions 616 inside the cloud 606, and a group of blocky regions 618 inside the cloud 608. The first image frame 600 also includes a group of blocky regions 620 to the left of the airplane 610, a group of blocky regions 622 above the airplane 610, a group of blocky regions 624 to the right of the airplane 610, and a group of blocky regions 626 below the airplane 610.

FIG. 6 further illustrates an example second image frame 650 after processing using the disclosed methods and apparatus. The second image frame 650 includes the clouds 602, 604, 606, and 608, and also includes the airplane 610. However, as shown in FIG. 6, after processing, a number of the blocky regions present in the first image frame 600 are either eliminated or are no longer visible. For example, while the cloud 602 still includes a blocky region 628 after blending, the cloud 604 no longer includes a group of blocky regions and instead includes only a single blocky region 630 that the processing was unable to eliminate. Additionally, while the cloud 606 still includes a group of blocky regions, the group of blocky regions 632 in the second image frame 650 includes fewer blocky regions than the group of blocky regions 616 inside the cloud 606 in the first image frame 600. In the cloud 608, all blocky regions are eliminated. Groups of blocky regions 634, 636, and 638 to the left of, above, and to the right of the airplane 610 generally include fewer blocky regions than the groups 620, 622, and 624, with the exception of the group of blocky regions 636, which like the group of blocky regions 622 above the airplane 610, includes three blocky regions. Below the airplane 610, only a single blocky region 640 remains. As will be understood from the disclosure and teaching herein, the first image frame 600 and the second image frame 650 are merely example illustrations of the ability of the disclosed methods and apparatus to modify (e.g., remove) gradation in an image frame, such as by the operations including blending as described above.

Figure 7:
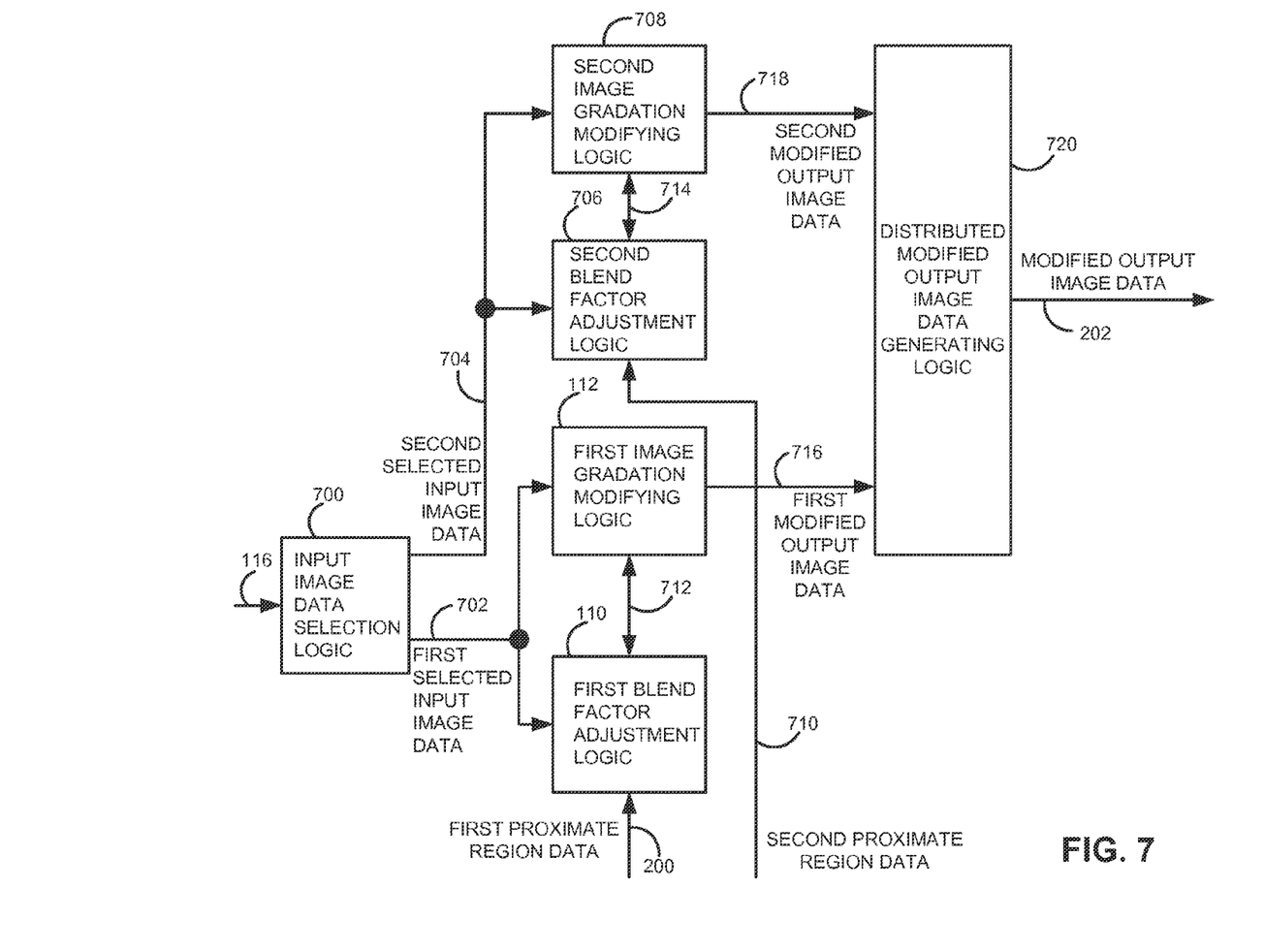
FIG. 7 is a functional block diagram illustrating an example in which an image processing apparatus includes additional blend factor adjustment logic and image gradation modifying logic to allow parallel processing of sections of an image frame.

FIG. 7 is a functional block diagram illustrating an example embodiment in which an image processing apparatus includes the blend factor adjustment logic 110 as first blend factor adjustment logic, the image gradation modifying logic 112 as first image gradation modifying logic, and also includes additional blend factor adjustment logic and image gradation modifying logic as described herein. The additional blend factor adjustment logic and image gradation modifying logic may, as discussed below, allow a number of digital signal processing circuits or "threads" supported by the hardware of, for example, the second processor 106 (e.g., a GPU), to process different sections of the image frame in parallel.

As discussed above with respect to FIG. 5, a certain number of regions of an image frame may need to be processed (e.g., by blending as described herein) before the results of such processing reliably produce image data with modified gradation instead of producing results that vary significantly from one result to the next because only several regions have been accounted for. Accordingly, in processing different sections of the image frame by parallel "threads," a certain amount of overlap between regions will be necessary for each thread. As a simplified example, one thread may process the eleventh, twelfth, thirteenth, fourteenth, fifteenth, and sixteenth pixels in a particular horizontal row of an image frame. Another thread in such an example may process the fourteenth, fifteenth, sixteenth, seventeenth, eighteenth, and nineteenth pixels in the particular horizontal row. The overlap created by having the second described thread process the fourteenth, fifteenth, and sixteenth pixels that were also processed by the first described thread may allow the second thread to begin blending regions (e.g., pixels) in a way that produces image data with modified gradation for the seventeenth, eighteenth, and nineteenth pixels.

Because the aforementioned overlap creates redundancy, the overlap increases computational cost. Accordingly, input image data selection logic 700, which may receive the input image data 116, may determine whether to use multiple processing threads, and if so, how many threads to use. The input image data selection logic 700 may make this determination based on factors indicating the amount of overlap that would be required such as, for example, the first and second coefficients as determined by the first blend factor adjustment logic 110, user input, manufactured or predefined settings regarding an amount of overlap required, etc. Based on the number of threads available, the number of regions (e.g., pixels) to be processed, and constraints regarding the amount of time in which the processing is to be completed, the input image data selection logic 700 may determine whether to use multiple threads at all and, if so, how many threads to use.

Accordingly, the example apparatus 100 of FIG. 1 may also include at least the logic necessary for use of a second thread. In a simplified example where the number of threads used is two, as shown in FIG. 7, the input image data selection logic 700 generates first selected input image data 702, which is a subset of the input image data selection logic 700, and second selected input image data 704, which is also a subset of the input image data selection logic 700. The first selected input image data 702 is input to the first blend factor adjustment logic 110 and the first image gradation modifying logic 112, instead of the input image data 116 being input to the first blend factor adjustment logic 110 and the first image gradation modifying logic 112 as discussed with respect to previous examples. The second selected input image data 704 is input to second blend factor adjustment logic 706 and second image gradation modifying logic 708.

In the example of FIG. 7, the first and second image gradation modifying logic 112 and 708 generate first modified output image data 716 and second modified output image data 718 in, for example, the manner discussed with respect to the first image gradation modifying logic 112 in previously illustrated examples. In some embodiments, the first and second modified output image data 716 and 718 may then be provided to distributed modified output image data generating logic 720, which suitably combines the first and second modified output image data 716 and 718 (e.g., including removing overlap) in order to generate the modified output image data 202.

Figure 8:
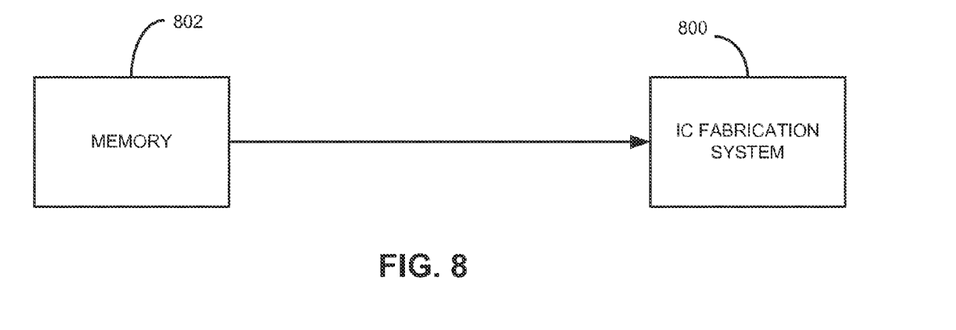
FIG. 8 is a functional block diagram illustrating one example of an integrated circuit fabrication system.

Referring to FIG. 8, an integrated circuit fabrication system 800 is shown which may include access to memory 802, which may be in any suitable form and any suitable location accessible via the web, accessible via hard drive or any other suitable way. The memory 802 is a non-transitory computer readable medium such as but not limited to RAM, ROM, and any other suitable memory. The IC fabrication system 800 may be one or more work stations that control a wafer fabrication to build integrated circuits. The memory 802 may include thereon instructions that when executed by one or more processors causes the integrated circuit fabrication system 800 to fabricate one or more integrated circuits that include the logic and structure described herein.

The disclosed integrated circuit designs may be employed in any suitable apparatus including but not limited to, for example, a mobile or smart phone, a phablet, a tablet, a camera, a laptop computer, a portable media player, a set-top box, or any other suitable device which plays video and/or displays images. Such devices may include, for example, a display that receives image data (e.g., image data that has been processed in the manner described herein, such as the modified output image data 202) from the one or more integrated circuits where the one or more integrated circuits may be or may include, for example, an APU, GPU, CPU or any other suitable integrated circuit(s) that provide(s) image data for output on the display. Such an apparatus may employ one or more integrated circuits as described above including one or more of blend factor adjustment logic, image gradation modifying logic, noise-generating logic, and other components described above.

Also, integrated circuit design systems (e.g., work stations including, as known in the art, one or more processors, associated memory in communication via one or more buses or other suitable interconnect and other known peripherals) are known that create wafers with integrated circuits based on executable instructions stored on a computer readable medium such as but not limited to CDROM, RAM, other forms of ROM, hard drives, distributed memory, etc. The instructions may be represented by any suitable language such as but not limited to hardware descriptor language (HDL), Verilog or other suitable language. As such, the logic and structure described herein may also be produced as one or more integrated circuits by such systems using the computer readable medium with instructions stored therein. For example, one or more integrated circuits with the aforedescribed logic and structure may be created using such integrated circuit fabrication systems. In such a system, the computer readable medium stores instructions executable by one or more integrated circuit design systems that causes the one or more integrated circuit design systems to produce one or more integrated circuits. The one or more integrated circuits include, for example, one or more of blend factor adjustment logic, image gradation modifying logic, and noise-generating logic that modify gradation in an image frame and reduce the appearance of blocky regions in an image frame without the need for complex detection techniques to identify the blocky areas and computationally-intensive filtering techniques to reduce the blockiness, as described above.

Among other advantages, for example, the disclosed methods and apparatus allow modification of gradation in an image frame without the need for two-dimensional filters with large support areas that operate on hundreds or even thousands of pixels for every pixel processed. The disclosed methods and apparatus may advantageously use a blend factor and operate in a 1-D manner, for example as an IIR filter, to remove or reduce gradation in an image frame in a less computationally-intensive and resource-intensive manner. Other advantages will be recognized by one of ordinary skill in the art.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method for modifying gradation in an image frame, the method comprising:

determining, by blend factor adjustment logic of an image processing apparatus, a blend factor indicating a first weighting associated with a previously modified portion of the image frame;

modifying, by image gradation modifying logic of the image processing apparatus, the gradation in a current region of the image frame by:

generating a weighted value for the current region of the image frame comprising:

applying the first weighting to the previously modified portion of the image frame to generate weighted previously modified portion data;

applying a second weighting to the current region of the image frame to generate weighted current region data; and combining the weighted previously modified portion data and the weighted current region data to generate the weighted value; and modifying the gradation in the current region of the image frame by applying the weighted value to the current region of the image frame;

storing the modified image frame in a memory; and displaying the modified image frame on a display.

2. The method of claim 1, wherein the blend factor further indicates the second weighting associated with the current region of the image frame.

3. The method of claim 2, wherein the first weighting is non-zero and the second weighting is non-zero so that modifying the gradation in the image frame comprises blending the current region of the image frame and the previously modified portion of the image frame.

4. The method of claim 1, comprising applying noise to the image frame based on values associated with regions of the image frame after modifying the gradation in the image frame.

5. The method of claim 1, wherein the current region of the image frame is a first current region, the method comprising modifying the gradation in the image frame in a first direction by further generating weighted values associated with each of a plurality of next current regions of the image frame, wherein each of the plurality of next current regions is located after the first current region along the first direction.

6. The method of claim 5, comprising modifying the gradation in the image frame in a second direction different from the first direction while modifying the gradation in the image frame in the first direction.

7. The method of claim 1, comprising determining that a value associated with the current region of the image frame differs with respect to one or more values associated with the previously modified portion of the image frame by a threshold amount and, in response, determining the blend factor to indicate that the first weighting associated with the previously modified portion of the image frame is zero so that modifying the gradation in the image frame comprises outputting the current region of the image frame from the image gradation modifying logic without blending the current region of the image frame and the previously modified portion of the image frame.

8. The method of claim 1, comprising determining the blend factor based on at least one of: (i) a difference of a value associated with the current region with respect to one or more values associated with the previously modified portion of the image frame, (ii) a relationship between one or more values associated with the current region and one or more values associated with one or more regions of the image frame in proximity to the current region, (iii) a relationship between a value associated with the current region and a threshold, and (iv) a count of a number of regions of the image frame that have been processed in modifying the gradation in the image frame.

9. An apparatus for modifying gradation in an image frame, the apparatus comprising:
blend factor adjustment logic operative to determine a blend factor indicating a first weighting associated with a previously modified portion of the image frame; and
image gradation modifying logic operatively coupled to the blend factor adjustment logic and operative to:
generate a weighted value for a current region of the image frame by:
applying the first weighting to the previously modified portion of the image frame to generate weighted previously modified portion data;
applying a second weighting to the current region of the image frame to generate weighted current region data; and
combining the weighted previously modified portion data and the weighted current region data to generate the weighted value; and
modify the gradation in the current region of the image frame by applying the weighted value to the current region of the image frame,
wherein the modified image frame is stored in a memory and displayed on a display.

10. The apparatus of claim 9, wherein the blend factor further indicates a second weighting associated with the current region of the image frame.

11. The apparatus of claim 9, comprising noise-generating logic operatively coupled to the image gradation modifying logic and operative to apply noise to the image frame based on values associated with regions of the image frame after the image gradation modifying logic modifies the gradation in the image frame.

12. The apparatus of claim 9, wherein the current region of the image frame is a first current region, wherein the image gradation modifying logic is operative to:
generate weighted values associated with each of a plurality of next current regions of the image frame located after the first current region along a first direction so as to generate first modified image data indicative of modification of the gradation in the image frame in the first direction; and
generate second modified image data indicative of modification of the gradation in the image frame in a second direction different from the first direction while generating the first modified image data,
wherein the image gradation modifying logic comprises decision logic operative to determine whether to output the first modified image data or the second modified image data as modified image data so as to modify the gradation in the image frame.

13. The apparatus of claim 9, wherein the current region of the image frame is a first current region, wherein the image gradation modifying logic is operative to generate weighted values associated with each of a plurality of next current regions of the image frame located after the first current region along a first direction so as to modify the gradation in the image frame in the first direction, and wherein the image gradation modifying logic is operative to modify the gradation in the image frame in a second direction different from the first direction.

14. The apparatus of claim 9, wherein the image gradation modifying logic is first image gradation modifying logic, the apparatus comprising at least second image gradation modifying logic, wherein a first subset of the first image gradation modifying logic and the at least second image gradation modifying logic is operative to generate weighted values associated with a first region along a first one of a plurality of sections of regions of the image frame in a first direction while at least a second subset of the first image gradation modifying logic and the at least second image gradation modifying logic generates weighted values associated with at least a second region along at least a second one of the plurality of sections of regions of the image frame in the first direction.

15. The apparatus of claim 9, wherein the blend factor adjustment logic is operative to:
determine that a value associated with the current region of the image frame differs with respect to one or more values associated with the previously modified portion of the image frame by a threshold amount and, in response, determine the blend factor to indicate that the first weighting is zero;
determine that a value associated with a subsequent region of the image frame differs with respect to one or more values associated with the previously modified portion of the image frame by less than the threshold amount;
determine, in response to determining that the value associated with the subsequent region differs by less than the threshold amount, when a further subsequent region is to be blended with a subsequent previously modified portion of the image frame; and
determine a new blend factor indicating a new first weighting associated with the subsequent previously modified portion, the new first weighting being non-zero so that the image gradation modifying logic is operative to blend the further subsequent region and the subsequent previously modified portion.

16. The apparatus of claim 9, comprising at least one of an accelerated processing unit (APU), a central processing unit (CPU), and a graphics processing unit (GPU), wherein the at least one of the APU, the CPU, and the GPU includes the blend factor adjustment logic and the image gradation modifying logic, and wherein the at least one of the APU, the CPU, and the GPU is operative to provide the image frame, after modifying the gradation in the image frame, for display on the display.

17. The apparatus of claim 9 further comprising the display operative to receive and display the modified image frame.

18. A non-transitory computer readable medium comprising executable instructions that when executed cause an integrated circuit (IC) fabrication system to fabricate one or more ICs that comprise:
blend factor adjustment logic operative to determine a blend factor indicating a first weighting associated with a previously modified portion of an image frame; and
image gradation modifying logic operatively coupled to the blend factor adjustment logic and operative to:
generate a weighted value for a current region of the image frame by:
applying the first weighting to the previously modified portion of the image frame to generate weighted previously modified portion data;
applying a second weighting to the current region of the image frame to generate weighted current region data, wherein the blend factor further indicates the second weighting; and combining the weighted previously modified portion data and the weighted current region data to generate the weighted value; and modify the gradation in the current region of the image frame by applying the weighted value to the current region of the image frame, wherein the modified image frame is stored in a memory and displayed on a display.

19. The non-transitory computer readable medium of claim 18 comprising executable instructions that when executed cause the IC fabrication system to fabricate the one or more ICs such that the blend factor further indicates the second weighting.

20. The non-transitory computer readable medium of claim 18 comprising executable instructions that when executed cause the IC fabrication system to fabricate the one or more ICs such that the one or more ICs comprise noise-generating logic operatively coupled to the image gradation modifying logic and operative to apply noise to the image frame based on values associated with regions of the image frame after the image gradation modifying logic modifies the gradation in the image frame.

21. The non-transitory computer readable medium of claim 18, wherein the current region of the image frame is a first current region, the non-transitory computer readable medium comprising executable instructions that when executed cause the IC fabrication system to fabricate the one or more ICs such that:

the image gradation modifying logic is operative to:
generate weighted values associated with each of a plurality of next current regions of the image frame located after the first current region along the first direction so as to generate first modified image data indicative of modification of the gradation in the image frame in the first direction; and generate second modified image data indicative of modification of the gradation in the image frame in a second direction different from the first direction while generating the first modified image data, and the image gradation modifying logic comprises decision logic operative to determine whether to output the first modified image data or the second modified image data as modified image data so as to modify the gradation in the image frame.

* * * * *